United States Patent Office 3,555,543
Patented Jan. 12, 1971

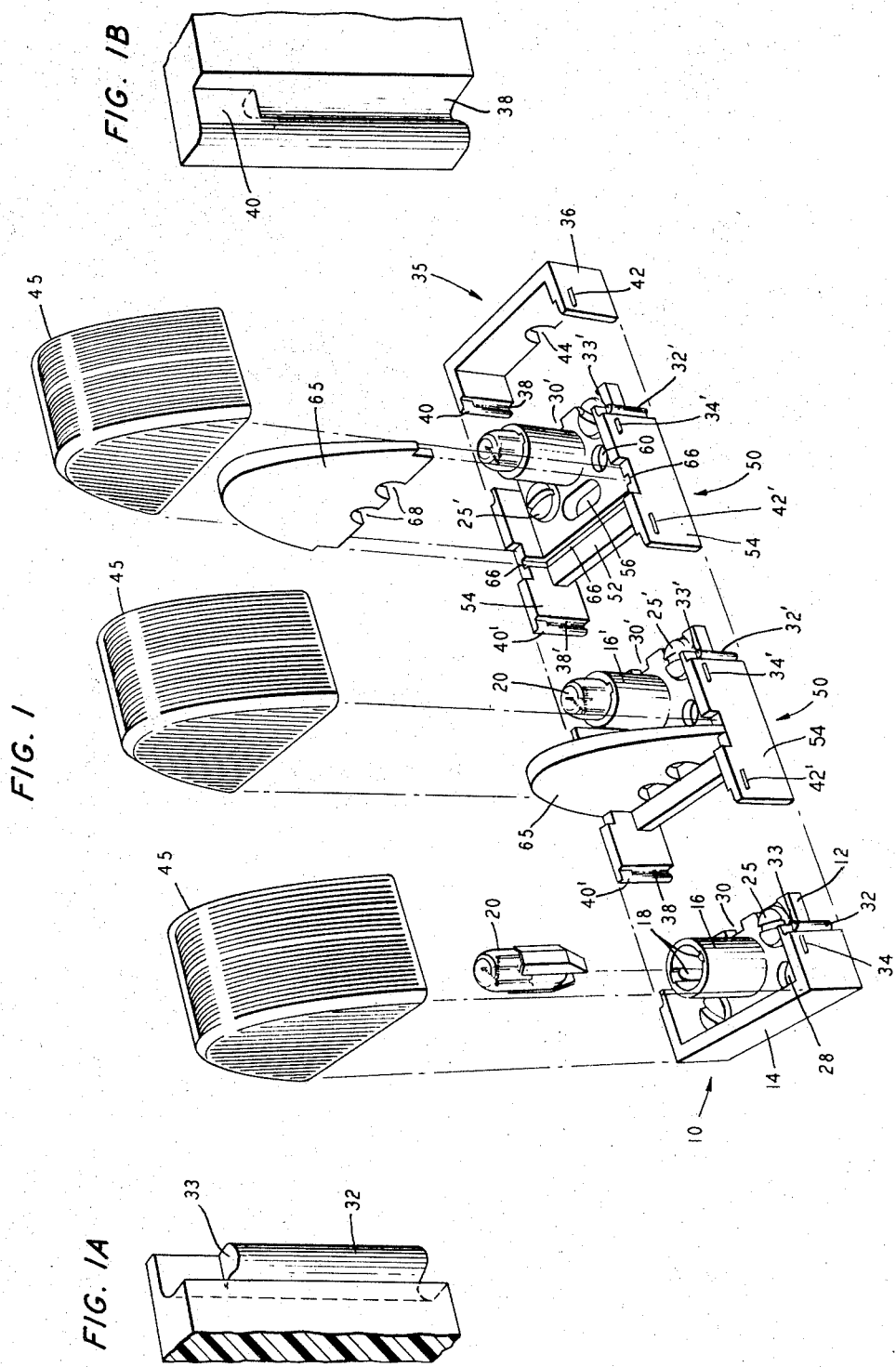

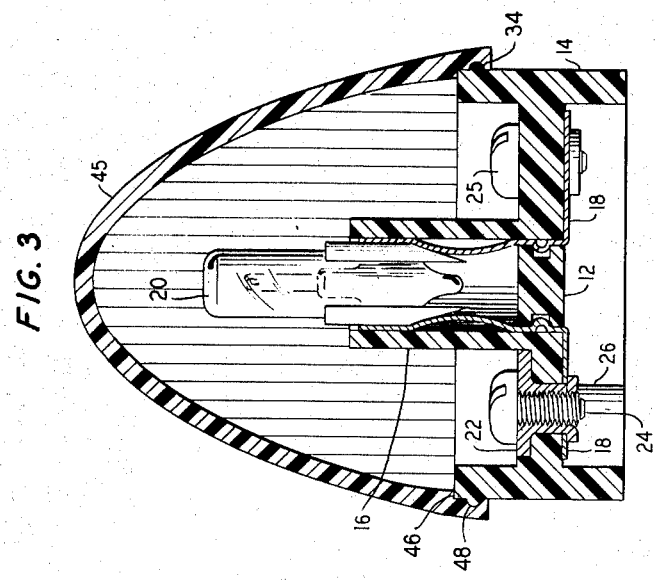
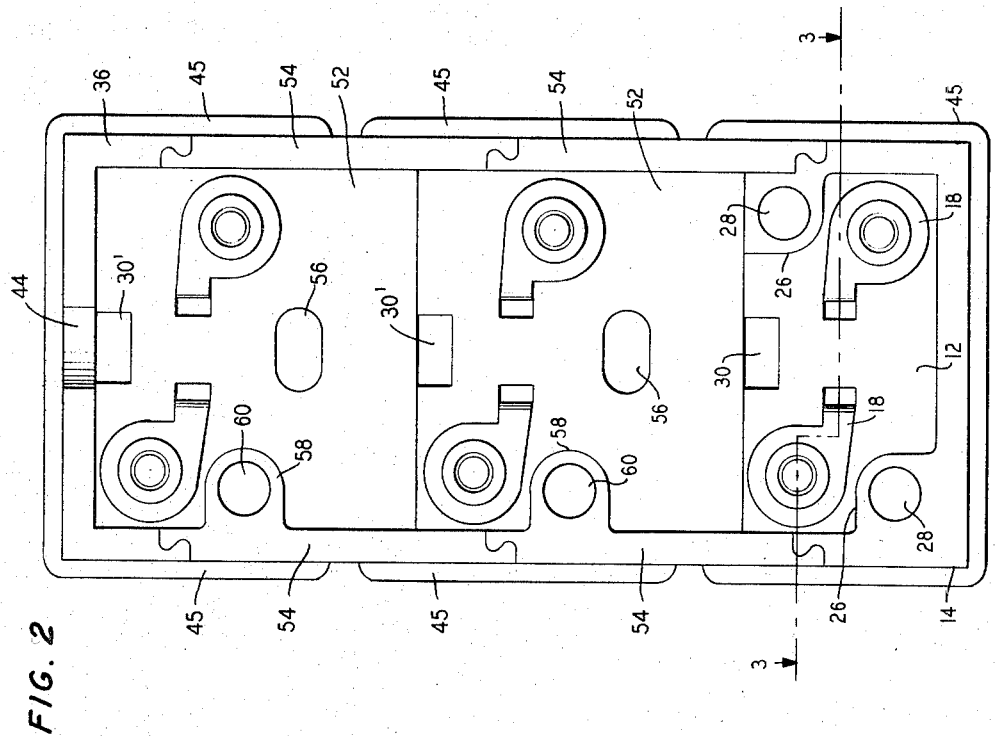

3,555,543
MODULAR VISUAL INDICATOR HAVING INTERLOCKING INDICATOR BASE MODULES
Harry P. Lynch, Greenfield, Ind., assignor to Bell Telephone Laboratories, Incorporated, Murray Hill and Berkeley Heights, N.J., a corporation of New York
Continuation of application Ser. No. 694,664, Dec. 29, 1967. This application Sept. 29, 1969, Ser. No. 863,681
Int. Cl. G08b 5/22
U.S. Cl. 340—366    10 Claims

ABSTRACT OF THE DISCLOSURE

An illuminated visual indicator embodying a modular concept in which single and multiple indicators are assembled from standard components consisting of a pair of interconnecting end base portions, an intermediate base portion connectable between the two end base portions, and a lens mountable on a pair of base portions. One of the end base portions comprises a lamp socket support and a wall encompassing a portion of the support while the other end base portion comprises a wall of a shape to encompass the remainder of the support whereby when the two are joined a complete base for a single indicator is formed. The intermediate base portion comprises a lamp socket support and a pair of walls on opposite sides of the support and is adapted to have an end base portion joined to each end thereof to form a complete base for a multiple indicator.

---

This is a continuation of application Ser. No. 694,664, filed Dec. 29, 1967 and now abanboned.

FIELD OF THE INVENTION

This invention pertains to the field of communications and within that field to electrical devices for giving visual indications by means of illumination.

An illuminated visual indicator typically consists of a base on which is mounted a lamp and a lens that encompasses the lamp. It is used to perform visual signaling by the illumination of the lamp.

DESCRIPTION OF THE PRIOR ART

Visual indicators are most commonly used in three different sizes, one having a single lamp and lens, one having two lamps and two lenses, and one having three lamps and three lenses. Heretofore the three sizes have been generally manufactured as three separate units, and suppliers have had to stock all three units in order to meet whatever orders they received. This has meant that they have had to maintain what amounts to a duplication of inventory since a unit having three lamps and three lenses has essentially the same elements as three units having a single lamp and lens each. However, because they are manufactured as integral units, the triple unit cannot be broken apart when only a single unit is needed nor can three single units be united when a triple unit is needed.

SUMMARY OF THE INVENTION

An object of this invention is to provide an illuminated visual indicator that employs a modular concept permitting single and multiple indicators to be assembled from standard components and when assembled to have a unitary appearance.

This and other objects are achieved in an illustrative embodiment in which the visual indicator comprises a first end portion including a support and a wall encompassing a portion of the support. The support has a lamp socket upstanding therefrom, and the wall has an outward facing tongue and groove at each end thereof. A second end portion includes a wall of a shape to encompass the remainder of the support of the first end portion, and the wall has an inward facing tongue and groove at each end thereof that conforms to the outward facing tongue and groove of the wall of the first end portion. Thus the two end portions can be joined together to form a base. In addition, the wall of each end portion has a ridge adjacent to each end thereof and when the end portions are joined together, the ridges cooperate to secure a lens thereon, the lens having recesses that accommodate the ridges. It is therefore seen that these elements combine to form a single visual indicator unit.

However, an intermediate portion is also provided that includes a support having a lamp socket upstanding therefrom and a pair of walls located on opposite sides thereof. The walls at one end have the same outward facing tongue and groove as the wall of the first end portion, and the walls at this end bear the same relationship to their support as the ends of the wall of the first end portion bears to its support. The walls at the other end of the intermediate portion have the same inward facing tongue and groove as the wall of the second end portion, and the walls at this end bear the same relationship to the support of the first end portion as the ends of the wall of the second end portion. In addition, the walls of the intermediate portion have a ridge adjacent to each end thereof corresponding location and size to the ridges on the first and second end portions. As a result, the intermediate portion can be joined with the two end portions and with the addition of another lens form a double visual indicator unit. Similarly, additional intermediate portions and lenses can be joined with these elements to form a visual indicator of any multiple.

DESCRIPTION OF THE DRAWING

FIG. 1 is an exploded perspective view showing the elements of the modular visual indicator of this invention;

FIG. 1A is an enlarged view of a portion of FIG 1 showing the tongue and groove configuration of the left end portion;

FIG. 1B is an enlarged view of a portion of FIG. 1 showing the tongue and groove configuration of the right end portion;

FIG. 2 showing the lamp socket and terminal of the visual indicator unit; and

FIG. 3 is a sectional view taken along line 3—3 of FIG. 2 showing the lamp socket and terminal of the visual indicator.

DESCRIPTION OF AN ILLUSTRATIVE EMBODIMENT

Referring to FIG. 1 of the drawing, the modular visual indicator of this invention comprises a first end portion 10 that includes a rectangular planar support 12 and a continuous U-shaped wall 14 that is integral with and extends perpendicular to the plane of the support. The wall 14 encompasses one longitudinal side and a portion of each transverse side of the support 12, and the support is located approximately midway between the upper and lower edges of the wall.

A tubular lamp socket 16 extends upwardly from the support 12, the lamp socket including a pair of opposing contacts 18 for making an electrical connection with the contacts of a lamp 20 accommodated by the socket. As seen in FIGS. 2 and 3, each contact 18 is an L-shaped member, the vertical leg being ribbon shaped and the horizontal leg being disc shaped. In addition, the vertical leg has a bowed portion at its center and a protrusion at its lower end while the horizontal leg has a hole in its center.

The vertical leg of each contact 18 is inserted into the socket 16 through a slot in the support 12 and is positioned within the socket with the bowed portion extending toward the center of the socket and the protrusion engaging a notch in the bottom of the socket. When the vertical legs are so positioned, the horizontal legs extend along the underside of the support 12, and the hole in each horizontal leg is located in registration with a hole that extends through the support, the holes being located in opposite corners of the support.

The upper surface of the support 12 surrounding each hole is provided with a hexagonal recess, and a metal eyelet 22 having a hexagonal flange is positioned within each hole with the flange located in the recess. The lower end of each eyelet 22 extends through the hole in the horizontal leg of the associated contact 18, and the lower end is swaged to secure the associated contact in place and make an electrical connection therewith. The eyelets 22 are internally threaded and complementing screws 24 are placed therein to provide screw terminals 25 for connecting electrical conductors to the contacts 18 of the lamp socket 16.

In the corners of the support 12 not occupied by the screw terminals 25, the support has bosses 26 that depend from the underside of the support to the lower edge of the wall 14. A mounting hole 28 extends through each boss 26 and the portion of the support 12 above it, and the holes are used to secure the first end portion to the surface on which the visual indicator is to be mounted. Finally, the longitudinal side of the support 12 not encompassed by the wall 14 has a notch 30 intermediate its ends through which the conductors connected to the terminals 25 are passed.

Referring again to FIG. 1, the wall 14 includes mechanical interconnecting means at each end thereof that consists of an outward facing tongue and groove 32. As seen in FIG. 1A, each tongue and groove 32 extends from the bottom edge of the wall 14 to a point adjacent to the top of the wall. The remainder of the height has the same shape as if the tongue had been removed to the bottom of the groove whereby a ledge 33 is provided at the top of the tongue. In addition, the wall 14 includes second mechanical interconnecting means consisting of a horizontal ridge 34 adjacent to each end and to the upper edge thereof.

The modular visual indicator of this invention further includes a second end portion 35 that comprises a U-shaped wall 36. The wall 36 has the same height as the wall 14 and it conforms to the portion of the support 12 that is not encompassed by the wall 14. In addition, the wall 36 has mechanical interconnecting means at each end thereof consisting of an inward facing tongue and groove 38 that conforms to the tongue and groove 32 of the wall 14. As shown in FIG. 1B, each tongue and groove 38 extends from the bottom edge of the wall 36 to the same height as the tongues and grooves 32. The remainder of the height has the same shape as if the groove had been filled to the top of the tongue whereby a stop 40 is provided in the groove.

The wall 36 also includes second mechanical interconnecting means that consists of a horizontal ridge 42 adjacent to each end and to the upper edge thereof, the ridges having the same configuration and the same spatial relationship as the ridges 34 on the wall 14. Finally, the wall 36 has a notch 44 intermediate its ends through which the conductors for making electrical connection with the terminals 25 are passed.

From the foregoing it is seen that the second end portion 35 can be joined with the first end portion 10 by sliding the inward facing tongues and grooves 38 down onto the outward facing tongues and grooves 32 until the stops 40 engage the ledges 33, in which position the top and bottom edges of the walls 14 and 36 are flush. The combined first and second end portions 10 and 35 provide a single unit base, that is, a base that accommodates a single lamp 20 and a lens 45 associated with the lamp.

The lens 45 of the present invention comprises a hollow parabolic member having flat sides. The open end of the lens 45 is of a size to overlap the upper edges of the single unit base, and as shown in FIG. 3, the front and rear lips of the lens are relieved to provide shoulders 46 that are adapted to rest on the corresponding upper edges of the base. In addition, the front and rear lips include mechanical interconnecting means consisting of recesses 48 that accommodate the ridges 34 and 42 of the first and second end portions 10 and 35 and secure the lens to the base when the lens is placed on the base with the shoulders 46 contiguous with the upper edges. The interior surface of the lens 45 is serrated to diffuse the light generated by the lamp 20 it encloses.

Referring again to FIG. 1, the visual indicator of this invention further includes an intermediate portion 50 that comprises a rectangular planar support 52 and a pair of walls 54 on opposite sides of the support. The walls 54 are integral with and extend perpendicular to the support 52 and are of the same height as the walls 14 and 36. In addition, the support 52 is located at the same position along the height of the walls as the support 12.

The support 52 has a lamp socket 16' upstanding therefrom that is the same as the lamp socket 16, the socket 16' having the same spatial relationship with respect to the right end of the support as the socket 16 has with respect to the right end of the support 12. Furthermore, the support 52 has a pair of screw terminal 25' and a notch 30' that are the same as the terminals 25 and the notch 30, the support also having a hole 56 through which conductors may also be passed. Finally, as seen in FIG. 2, the support 52 has a single boss 58 depending from the underside thereof to the lower edge of the walls 54, and a mounting hole 60 extends through the boss and the portion of the support above it.

Turning once again to FIG. 1, the right end of each wall 54 is provided with the same mechanical interconnecting means as the ends of the wall 14 of the first end portion 10. Specifically, the right end of each wall 54 has an outward facing tongue and groove 32' and ledge 33' that are identical to the outward facing tongue and groove 32 and ledge 33 of each end of the wall 14. The right end of each wall 54 also has a ridge 34' that is identical in size, shape, and location to the ridges 34 on the wall 14. In addition, the right end of each wall 54 bears the same spatial relationship to the right end of the support 52 that the ends of the wall 14 bear to the support 12.

Similarly, the left end of each wall 54 is provided with the same mechanical interconnecting means as the ends of the wall 36 of the second end portion 35. More particularly, the left end of each wall 54 has an inward facing tongue and groove 38' and a stop 40' that are identical to the inward facing tongue and groove 38 and stop 40 of each end of the wall 36. The left end of each wall 54 also has a ridge 42' that is identical in size, shape, and location to the ridges 42 on the wall 36.

Furthermore, the upper edge of each wall 54 is relieved about midway between the ends of the wall whereby the upper edge has two separate surfaces and each of these surfaces respectively corresponds to an upper surface on the first and second end portions 10 and 35. The surfaces at the right end of the walls 54 are the same as the surfaces of the right angle legs of the wall 14, while the surfaces at the left end of the walls 54 are the same as the surfaces of the right angle legs of the wall 36.

From the foregoing relationships it is seen that a visual indicator of any multiple can be assembled using the described members. Thus even if a single visual indicator has been already installed and it becomes desirable to have an additional visual indicator at the same location, it is only necessary to remove the lens 45 and the second end portion 35, leaving the first end portion 10, which is fastened to the mounting surface, undisturbed. An intermediate portion 50 is then joined to the first end portion 10 and secured to the mounting surface, and conductors are connected to the terminals 25'. The second end portion 35 is joined to the intermediate portion 50, the original lens 45 is mounted on the first end portion 10 and intermediate portion, and an additional lens is mounted on the intermediate portion and second end portion to complete the assembly. The visual indicator can of course be increased to any multiple size by the joining of additional intermediate portions 50, a lens 45 being added for each such intermediate portion.

In order to prevent the light generated by the illumination of one lamp 20 from entering adjacent lenses 45 of a multiple visual indicator unit and thereby give the appearance that more than one lens is illuminated, an opaque partition 65 is mounted in slots 66 on the inside surfaces of the walls 54 of each intermediate portion 50 and the upper surface of the support 52. The partition 65 has the same parabolic shape as the lenses 45, and it is provided with two notches 68 so as to permit the terminals 25 and 25' at either the front or the rear to be electrically connected together by a common bus extending along the upper surface of the supports 12 and 52.

What I claim is:

1. A modular visual indicator comprising:
    a first base portion having a support and wall encompassing a portion of the support, the support including a lamp socket, and the wall including mechanical interconnecting means at each end thereof;
    a second base portion having a wall of a shape to encompass a portion of the support of the first base portion, the wall including mechanical interconnecting means at each end thereof joinable with the mechanical interconnecting means of the wall of the first base portion, the second base portion when joined to the first base portion forming a complete base;
    a third base portion for positioning intermediate the first and second base portions, the third base portion having a support and a pair of walls on opposite sides of the support, the walls at one end having the same mechanical interconnecting means as the ends of the wall of the first base portion and at the other end having the same mechanical interconnecting means as the ends of the walls of the second base portion whereby the third base portion is joinable to the first and second base portions and when so joined forms a complete base; and
    at least one lens mountable on each complete base.

2. A modular visual indicator as in claim 1 wherein the support of the third base portion includes a lamp socket.

3. A modular visual indicator as in claim 2 wherein an individual lens encompasses each lamp socket.

4. A modular visual indicator as in claim 3 wherein the third base portion further includes an opaque partition extending between the walls thereof intermediate the ends of the walls, the partition being of a size and configuration to prevent light from a lens positioned on one side of the partition from entering a lens positioned on the other side of the partition.

5. A modular visual indicator as in claim 1 wherein the ends of the walls of the third base portion that have the same mechanical interconnecting means as the first base portion also have the same spatial relationship with respect to the support of the third base portion as the ends of the walls of the first base portion have to the support thereof.

6. A modular visual indicator as in claim 5 wherein the other ends of the walls of the third base portion in combination with the support thereof are of a shape to encompass the portion of the support of the first base portion not encompassed by the wall of the first base portion.

7. A modular visual indicator comprising:
    a first base portion having a support and a wall encompassing a portion of the support, the support including a lamp socket, and the wall including first mechanical interconnecting means at each end thereof and second mechanical interconnecting means intermediate the ends;
    at least one second base portion having a support and a pair of walls on opposite sides of the support, the support including a lamp socket, and each wall including first mechanical interconnecting means at each end thereof and second mechanical interconnecting means intermediate the ends, the walls at one end having first mechanical interconnecting means joinable with the first mechanical interconnecting means of the wall of the first base portion and at the other end having the same first mechanical interconnecting means as the corresponding ends of the wall of the first base portion;
    a third base portion having a wall including first mechanical interconnecting means at each end thereof and second mechanical interconnecting means intermediate the ends, the first mechanical interconnecting means being joinable with the first mechanical interconnecting means of the first base portion; and
    at least two lenses, each lens including mechanical interconnecting means joinable with the second mechanical interconnecting means on the base portions, and each lens being mountable on a pair of base portions when the two are joined together.

8. A modular visual indicator as in claim 7 wherein the first mechanical interconnecting means on one base portion element comprises a tongue and groove that extends for a portion of the height of the element and the remainder of the height has the tongue removed to provide a ledge, and the first mechanical interconnecting means on the cooperating base portion element comprises a complementing tongue and groove that extends for the same portion of the height of the element and the remainder of the height has the grooves filled to provide a stop that abuts against the ledge.

9. A modular visual indicator as in claim 7 wherein the second mechanical interconnecting means of the base portions comprises ridges and the cooperating mechanical interconnecting means on the lenses comprises recesses that complement the ridges.

10. A modular visual indicator as in claim 7 wherein the second base portion further includes an opaque partition extending between the walls thereof intermediate the ends of the walls, the partition being of a size and configuration to prevent light from a lens positioned on one side of the partition from entering a lens positioned on the other side of the partition.

References Cited

UNITED STATES PATENTS

| | | | |
|---|---|---|---|
| 2,008,886 | 7/1935 | Van Dyke et al. | 340—366 |
| 2,912,568 | 11/1959 | Winkler | 240—51.11X |
| 3,377,488 | 4/1968 | Lorenzo | 240—51.11X |

HAROLD I. PITTS, Primary Examiner

U.S. Cl. X.R.

240—151, 51.11, 52.11; 340—381